UNITED STATES PATENT OFFICE.

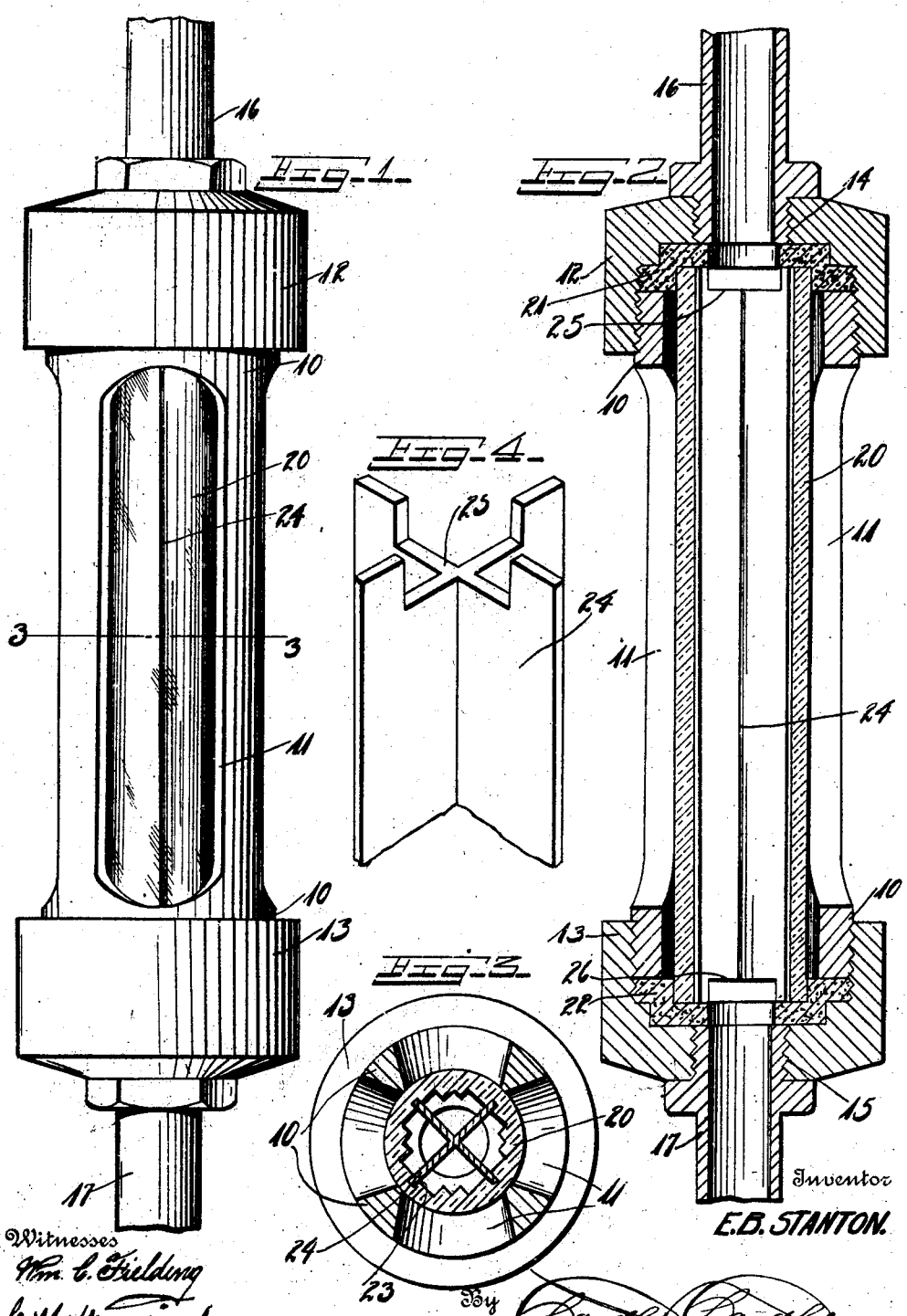

ED B. STANTON, OF GRAND ISLAND, NEBRASKA.

WATER-GAGE.

992,612.  Specification of Letters Patent.  Patented May 16, 1911.

Application filed July 2, 1910. Serial No. 570,098.

*To all whom it may concern:*

Be it known that I, ED B. STANTON, a citizen of the United States, residing at Grand Island, in the county of Hall, State of Nebraska, have invented certain new and useful Improvements in Water-Gages; and I do hereby declare the following to be a full, clear, and exact description of the invention, such as will enable others skilled in the art to which it appertains to make and use the same.

This invention relates to the water gages employed in connection with steam generators and the like, and has for one of its objects to improve the construction and increase the efficiency and utility of devices of this character.

Another object of the invention is to provide a device of this character wherein the level of the water in the generator may be more readily discernible.

Another object of the invention is to provide a device of this character in which the parts may be readily separated for renewal or repairs.

With these and other objects in view the invention consists in certain novel features and construction as hereafter shown and described and then specifically pointed out in the claims, and in the drawings illustrating the preferred embodiment of the invention, Figure 1 is a side elevation of the improved device. Fig. 2 is a longitudinal sectional elevation. Fig. 3 is a transverse section on the line 3—3 of Fig. 1. Fig. 4 is an enlarged perspective view of a portion of the dividing device.

The improved device comprises a cylindrical body 10 threaded at the ends and with spaced longitudinal openings 11, with just sufficient metal left between the openings to support the threaded ends.

Fitting over the threaded ends of the body 10 are caps 12—13, the caps having threaded central apertures 14—15 to receive nipple devices 16—17, the nipples designed to be connected with the usual couplings whereby the device is connected with the generator above and below the water line.

Disposed within the tubular member 10 is a glass tube 20 with rubber or other flexible gaskets 21—22 between the ends of the glass tube 20 and the caps 12—13, as shown. By this simple means the glass tube is supported within the tubular member 10 and observable through the openings 11. The interior of the glass tube 20 is formed into a plurality of longitudinally extending grooves or channels 23 preferably U-shaped and extending around the whole interior of the tube.

Disposed within the tubular member 20 and fitting into the grooves 23 is a dividing device 24 preferably in cross form and dividing the interior of the tube 20 into a plurality of longitudinal compartments. The gaskets 21—22 extend inwardly and engage over the ends of the dividing member 24, and thus support it in position and prevent its accidental displacement. By this simple means it will be obvious that the water rising in the tube appears darker by reason of the presence of the member 24 than it would otherwise, and its level is thereby rendered more discernible, especially in a dim light, while the steam within the tube above the water appears whiter and more distinct so that the level of water will be more readily ascertained, and the liability of error decreased.

The device is simple in construction, can be readily applied to any of the steam generators in common use or other structures requiring a device of this character.

By forming the body 10 with the plurality of apertures 11 the tube 20 may be observed from all sides, and when employed upon locomotives may be simultaneously viewed by both the engineer and fireman from their places in the cab without turning the glass. The "cage" formed by the member 10 with its openings 11 prevents the glass from flying laterally in case of breakage, as the solid portions of the body 10 between the openings hold the pieces within the "cage".

At its ends the member 24 is cut-away centrally as shown at 25—26, thus providing for the free passage of the water around the ends of the wings, each end of the member 24 thus resembling a plurality of feet spaced apart, as shown more particularly in Fig. 4. The interior of the member 20 is preferably approximately square, with the U-shaped grooves 23 in the square interior faces, as shown in Fig. 3. By this means the walls of the member 20 where the wings of the member 24 engage it may be thicker than would be the case if the tube were a true annulus in cross section.

It will be noted that the gaskets 21—22 are arranged with shoulders so that the glass member 20 is held away from contact with the cylindrical member 10, and thus prevented from coming in contact with the metal members.

What is claimed, is:—

1. A device of the class described, comprising a transparent tube provided with a plurality of longitudinal channels formed in its inner wall, and a detachable partition member seated within said channels to divide the interior of the tube into a plurality of longitudinal compartments, substantially as and for the purpose specified.

2. A device of the class described comprising a tubular body threaded at the ends and provided with a plurality of longitudinal openings, caps engaging the threaded ends of said tubular body, a transparent tube disposed within said body and formed with a plurality of longitudinal interior channels, plates removably engaging said channels and dividing the interior of the tube into a plurality of longitudinal compartments, and gaskets bearing upon the ends of said tube and extending over the plates disposed therein and engaged by said caps at their outer faces.

In testimony whereof, I affix my signature, in presence of two witnesses.

ED B. STANTON.

Witnesses:
J. P. WEIDENTHALER,
J. A. FITZGERALD.